(12) United States Patent
Golecki

(10) Patent No.: US 6,737,120 B1
(45) Date of Patent: May 18, 2004

(54) OXIDATION-PROTECTIVE COATINGS FOR CARBON-CARBON COMPONENTS

(75) Inventor: Ilan Golecki, Parsippany, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/518,013

(22) Filed: Mar. 3, 2000

Related U.S. Application Data

(60) Provisional application No. 60/123,018, filed on Mar. 4, 1999.

(51) Int. Cl.⁷ ................................. B05D 1/02
(52) U.S. Cl. ................ 427/421; 427/422; 427/427; 427/429; 423/447.3
(58) Field of Search .............. 423/447.3; 427/421, 427/422, 427, 429

(56) References Cited

U.S. PATENT DOCUMENTS

| 5,298,311 A | 3/1994 | Benston et al. ............. 428/216 |
| 5,368,938 A | 11/1994 | Holzl et al. ................. 428/408 |
| 5,599,624 A | 2/1997 | Prochazka ................. 428/375 |
| 5,686,144 A | 11/1997 | Thebault et al. |
| 5,714,244 A | 2/1998 | Delaval et al. |
| 5,725,955 A | 3/1998 | Tawil et al. |
| 5,736,232 A | 4/1998 | Shih et al. .................. 428/210 |
| 5,759,622 A | 6/1998 | Stover |
| 5,853,821 A | 12/1998 | Balhadere et al. |
| 5,876,850 A | 3/1999 | Skowronski et al. ....... 428/408 |

FOREIGN PATENT DOCUMENTS

| EP | 0 482 782 A1 | 4/1992 |
| JP | 230066 | 12/1984 |
| RU | WO 93/10057 | 5/1993 |
| RU | WO 93/10058 | 5/1993 |

Primary Examiner—Cynthia H. Kelly
Assistant Examiner—J. M. Gray
(74) Attorney, Agent, or Firm—Oral Caglar, Esq.

(57) ABSTRACT

A coating for protecting a carbon fiber or carbon—carbon (C—C) composite component from oxidation comprises a precursor of fluidized glass applied to the component. The precursor-coated component is gradually heated to a temperature of between 250–650° C. to anneal the coating to the component. Alternatively, a thermally matched refractory coating is applied to the C—C component by chemical vapor deposition to create an initial oxidation barrier. The fluidized glass is then applied on top of the refractory coating to enhance the oxidation barrier.

18 Claims, 2 Drawing Sheets

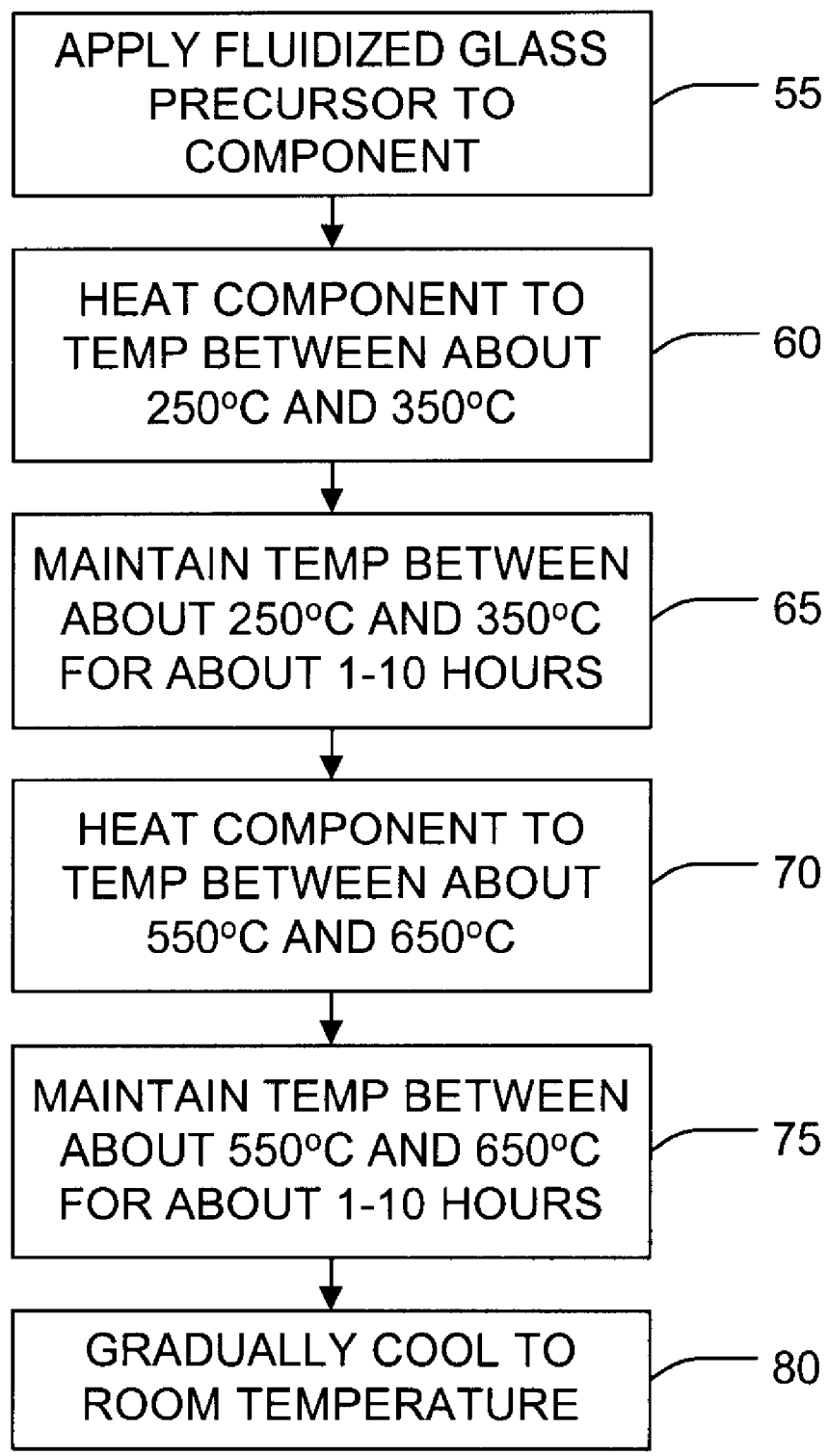

OXIDATION-PROTECTIVE COATINGS FOR CARBON-CARBON COMPONENTS

This application claims the benefit of provisional application No. 60/123,018 filed on Mar. 4, 1999.

BACKGROUND OF THE INVENTION

The present invention generally relates to carbon fiber and carbon matrix composites such as Carbon—Carbon (hereinafter "C—C") composites.

It is well known that carbon fiber and C—C composites each possess a combination of high strength, high fracture toughness, low density, very high thermal conductivity and high electrical conductivity. It is also known that the mechanical strength of carbon fiber and C—C composites will actually increase as the operating temperature increases, in sharp contrast to most metals and metallic alloys that become softer and weaker as the temperature increases. This combination of attributes would seem to make carbon fiber and/or C—C composites good candidates for many high temperature applications such as components used in aerospace heat exchangers and aircraft brake pads.

However, the carbon in carbon fiber and C—C composites tends to oxidize when exposed to air or other oxidizing environments when the temperature exceeds approximately 300° C. When the carbon oxidizes, it loses mass with the formation of $CO_2$ and CO gases as oxidation products. This loss in mass directly leads to loss of mechanical strength, as well as loss of integrity, functionality and ultimately to the failure of the component.

In order to protect the C—C component from oxidizing when subjected to repeated or sustained high temperatures, various barrier coatings may be applied to the components. Known barrier coatings tend to develop micro-cracks over time. These micro-cracks allow oxidizing agents to penetrate the coating and reach the underlying C—C composite, resulting in loss of mass and ultimately in component failure.

It has been found that the problem of protecting C—C components from oxidizing when subjected to operating temperatures up to about 1100° C. is particularly troublesome when the carbon component is as thin as 3 to 30 mil gauge, and/or complex in shape. Such components may range from fine-dimensioned corrugated fins to complex heat exchanger core assemblies.

There clearly exists a need to prevent oxidation of the carbon fiber or C—C component over its life cycle.

SUMMARY OF THE INVENTION

This need is met by the coatings and methods of application carried out in accordance with the present invention. A fluidized-glass type mixture that is maintained as a liquid precursor at a temperature of between approximately 20–90° C. is applied to a component formed of carbon fiber or C—C composite. Once coated with the precursor, the coated C—C component is heat-treated or annealed for at least one cycle through a series of gradual heating and cooling steps. This creates a glass coating having a thickness in the range of about 1–10 mils. The thickness may be controlled by the composition of the fluidized glass precursor mixture, the number of application cycles and the annealing parameters.

In accordance with a further aspect of the present invention, a thermally matched refractory coating in the form of a ceramic or glass-ceramic mixture is applied to a C—C or carbon graphite component by chemical vapor deposition or by plasma-enhanced chemical vapor deposition (PECVD) and infiltration. The specific properties of the refractory coating depend on the deposition conditions, including temperature, plasma power, and partial pressure of the precursor. The refractory coating applied either by CVD or PECVD may serve as the protective coating or be augmented by a fluidized glass coating applied to the coated C—C component as above stated.

BRIEF DESCRIPTION OF THE DRAWINGS

FIG. 3 is a flow chart of a method for applying an oxidation protective fluidized coating to a C—C composite substrate in accordance with the present invention.

DETAILED DESCRIPTION OF THE INVENTION

Known barrier coatings applied to carbon fiber or C—C composite components have failed to protect the carbon component substrate against oxidation due primarily to the difference in thermal expansion coefficients between the specific coating and the C—C component substrate. For example, in a component made from a two-dimensional woven carbon substrate, the component exhibits non-isotropic coefficients of expansion. In an in-plane direction, the thermal expansion coefficient is about -1 ppm/° C. between room temperature and about 300° C. and the thermal expansion coefficient increases to about 1 ppm/° C. up to about 600° C. In a through-plane direction (that is, where no carbon fibers are present), the coefficient is about 2–4 ppm//° C. If a barrier or protective coating has a thermal expansion coefficient of 3–5 ppm/° C., the coating and substrate portions will expand at differing rates when subjected to elevated temperatures. Micro-cracks will develop over time in the coating, eventually allowing air to penetrate and oxidize the C—C substrate. Resulting will be a loss of mechanical strength, as well as loss of integrity, functionality and ultimately failure of the component.

The present invention embodies a carbon fiber or C—C composite component coated with a fluidized glass precursor coating. After the precursor is applied to the component, it is heat treated to create a glassy coating. After the component is cooled, a glass coating has been created that is capable of protecting the composite component against oxidation during repeated exposures where the usable time-temperature profile covers an operating time at temperatures ranging from room temperature to a temperature of about 650–750° C.

The temperature at which a glass will become liquid depends upon the glass composition and processing or synthesis details. The glass may become liquid in the temperature range of between -50° C. and +1100° C., more specifically in the range between 200° C. and 850° C. and most desirably between 300° C. and 700° C. When the range at which the fluidized glass precursor becomes liquid overlaps the range the carbon oxidizes, the resulting glass coating is matched to protect the carbon from oxidation.

Figure 1:
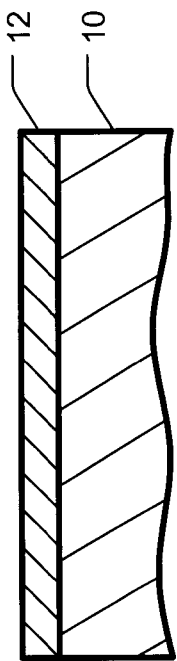
FIG. 1 is a schematic view of a Carbon fiber or C—C substrate having a coating formed in accordance with the present invention.
Figure 2:
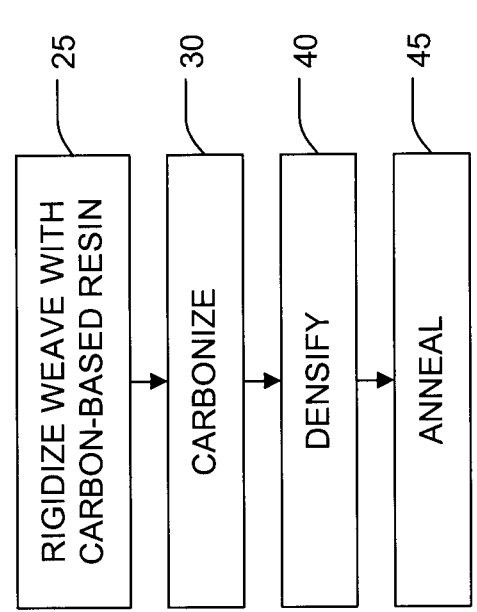
FIG. 2 is a flow chart of a method of forming C—C components capable of functioning in a high temperature environment when coated.

Before the fluidized glass precursor is applied to the C—C composite component, the component is fabricated in almost any desired shape. The invention is especially adaptable for thin gauge and/or complex shaped C—C components. For example, and without limitation to the actual shape of any component, a C—C composite component may take the shape of corrugated heat exchanger fins or similar heat exchanger components having a thickness of between 3 and 30 mils (0.07–0.75 mm). Alternatively, the C—C composite component may take the shape of aircraft brake pads or missile cone parts having a thickness of over 1 inch For a better understanding of the present invention, attention is now directed to FIG. 1, wherein a carbon fiber or C—C composite component is generally illustrated at 10. The component 10 is covered by a protective coating 12. For purposes of example only, the C—C composite component 10 may be fabricated by a process set forth in a flow chart 20 of FIG. 2. The component 10 may be formed from either two-dimensional woven fabric panels of pitch-based Amoco P30X Carbon fiber tows in a harness satin weave, or a pitch-based Nippon XNC25 in a plain weave or even YS15 carbon fiber tows in a plain weave. The tows are rigidized with a small amount (few percent range) of carbon-containing resin, such as epoxy Novolac (step 25). The material is then carbonized at a temperature in the range of 800–1000° C. (step 30) and densified by carbon CVD (step 40). The resulting material is then annealed in an inert gas at a temperature in the range of 2200–2600° C. (step 45). This process creates a C—C composite component that is adaptable for use in high temperature environments when properly protected against oxidation. It is to be understood that the oxidation protective coating of the present invention is intended to be applicable to C—C composite components regardless of how the C—C composite components are fabricated.

The composite component 10 is immersed or bathed in a fluidized glass precursor. After immersion and further processing, the composite component 10 is enveloped within a fluidized glass protective coating 12. The coating 12 comprises a glass material capable of at least some flowing with at least partial sealing of preexisting cracks in the C—C component.

The fluidized glass material may comprise any number of glass type materials, including but not limited to borate glasses (boron oxide), phosphate glasses (phosphorus oxide), silicate glasses (silicon oxide), plumbate glasses (lead oxide) with or without additions. These glasses may include phosphates of manganese, nickel, vanadium, aluminum, zinc and others; alkaline or alkaline-earth metals, such as lithium, sodium, potassium, rubidium, magnesium, or calcium and their respective oxides. Also included may be elemental boron and its compounds such as BN, $B_4C$, $B_2O_3$, $H_3BO_3$ and others. The specific ingredients of the fluidized glass coating 12 will depend on the desired properties of the glass, such as viscosity during both application and subsequent use and functional dependence of viscosity and vapor pressure as a function of temperature. Other factors include the amount of boron-containing particulates and the ratio of particulates to liquid during application.

The desired properties of the glass material may be tailored to the temperature range over which coating 12 protects the composite component 10 from destructive oxidation. Likewise, the thickness and number of glass coatings applied to component 10 will depend on the method of applying the coating and the intended use for the composite component 10. If the component will be subjected to sustained high temperatures, a number of separate glass coatings may be applied over each other to reduce the chance of micro-cracks developing during formation.

Referring now to FIG. 3, a flow chart 50 shows a first method of coating a C—C component 10 with the protective coating 12. The C—C component 10 is preferably immersed or dipped in liquid bath precursor of fluidized glass for several minutes (step 55). The liquid precursor is maintained at a temperature in the range of about 20–90° C. The component 10 and/or the liquid precursor may be rotated relative to one another to improve the wetting characteristics and uniformity of the coating.

After the immersion step is completed, the glass-coated component 10 is removed and annealed or heat-treated in a non-oxidizing environment. The annealing step is preferably carried out with a relatively slow ramp-up and possibly slow ramp-down of the heating and cooling rates, respectively. For example, the ramp-up rate may be in the order of 1–2° C. per minute. The temperature time-cycle of the annealing process may vary. For example, the heat treatment may include a gradual ramp up in temperature to about 250–350° C. at the aforestated rate of 1–2° C. per minute (step 60). The heat treatment or annealing may be followed by a soak, wherein the temperature is maintained in the temperature range of 250–350° C. for approximately 1–10 hours (step 65). Upon completing the extended heating at 250–350° C., the temperature may be further increased at the same rate of about 1–2° C. until reaching a range of 550–650° C. (step 70). The temperature is then maintained in the range of 550–650° C. for another period of approximately 1–10 hours (step 75). After completing the second prolonged heat treatment for between 1–10 hours at about 550–650° C., the component may be gradually cooled at the same rate of approximately 1–2° C. per minute until reaching room temperature (step 80).

The annealing environment may include an inert flowing gas such as nitrogen or argon. Alternatively, the component 10 may be located in a vacuum chamber. In either case, upon completion of the annealing step, the fluidized glass coating is converted to a solid glass coating 12 completely enveloping and forming a protective barrier against undesirable oxidation of the C—C component 10.

The immersion/dipping (step 55) followed by the annealing (steps 60–80) comprise a single cycle. It may be desirable to subject the coated component 10 to more than one cycle in order to enhance the level of oxidation protection. Typically, two, three or even more cycles may be repeated. When performing multiple cycles, at least one of the intermediate cycles may only heat the coated component to a range of 250–350° C. When a lower heating level is utilized for at least one intermediate cycle, the final cycle should include heating the component to the higher temperature of between 550–650° C.

By way of example, the liquid fluidized glass precursor mixture may include by weight percentage: water 55%, phosphoric acid 29%, manganese phosphate 2%, potassium hydroxide 3%, boron nitride 1%, and boron 10%. The resulting thickness of the coating 12 formed by such a mixture may be, after annealing, in the range of 1–10 mil (0.02–0.25 mm). The weight added to the C—C component 10 as a result of the immersion step is less than would be otherwise expected if the glass coating 12 had 100% of its theoretical density. This is desirable, since the weight of the C—C component 10 and coating 12 should be as low as possible if employed in aircraft flow platforms (where weight is an important factor).

In order to test the durability of glass coated C—C components of approximately 10 mil thickness to resist oxidation, numerous sets of such C—C specimens were weighed and their dimensions measured prior to being glass coated and again after undergoing the dip coating and annealing process. The coated components were then subjected to a flowing stream of dry air in an alumina tube while heated in a furnace having a uniform hot zone sufficiently large to encompass the components. The dry flowing air was maintained at a temperature of approximately 650° C. The previously weighed specimens exhibited no weight loss as compared to the as-coated weights, even after about 300 hours of exposure to a temperature of about 650° C. Additional sets of coated C—C components suffered no weight loss when exposed to temperatures of 650° C. for 50 hours, 550° C. for 120 hours and 450° C. for 120 hours, as compared to the as-coated weights. This was a significant finding of the effectiveness of the glass coating in protecting the carbon substrate against oxidation failure of the component. Some specimens exhibited slight weight gains after exposure to the flowing air at 650° C.

According to another aspect of the present invention, a thermally-matched refractory coating such as $SiO_XC_Y$, may be applied to component 10 by CVD before a fluidized glass coating is applied. The thermal expansion coefficient, as well as other properties of $SiO_XC_Y$ type refractory materials depend on the ratio of x:y and on the deposition conditions, such as temperature, plasma power, and partial pressures of the precursors. Other refractory glass or glass-ceramic coatings that may be applied to the C—C component by CVD or PECVD include SiC, $Al_2O_3$ and $Si_3N_4$. Such refractory coatings are especially adaptable for application onto and into thin-gauge or complex shaped C—C components, for example, fine-dimensioned corrugated fins having densities of 2–30 fins per inch or heat exchanger core assemblies.

Figure 4:
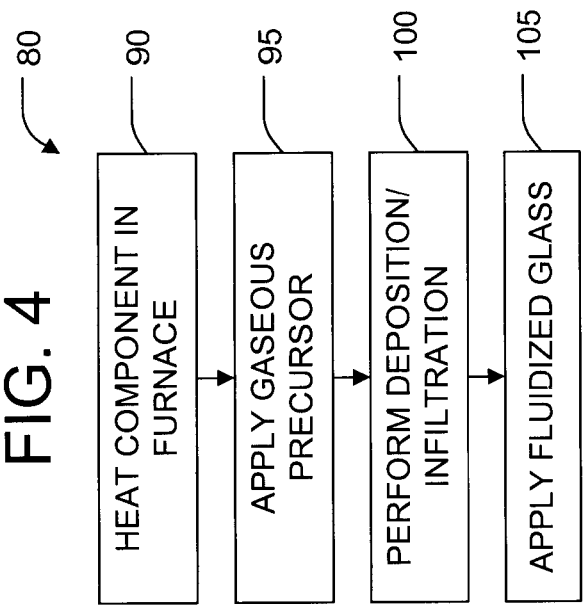
FIG. 4 is a flow chart of a method of applying a combination of two types of oxidation protective coatings to a C—C composite substrate in accordance with the present invention.

As illustrated by the flow chart 85 in FIG. 4, gaseous precursors of $SiO_XC_Y$, may be applied to component 10 in a PECVD and infiltration process. For example, gaseous precursors, such as methylsilane ($SiCH_3H_3$) and nitrous oxide ($N_2O$) are made to flow through mass flow controlled gas lines over and around a C—C component 10 when placed in a quartz tube positioned inside a furnace hot zone (step 90). The furnace is preferably heated to a temperature in the range of 20–900° C., and for example 700° C. A copper coil is placed concentrically around the upstream, cold end of the quartz tube. The coil is connected to a radio-frequency power supply through a matching network. The power supply is energized at 13.5 MHz frequency to power the coil at a level in the range of 10–500W and more typically about 200 W. Additional gases such as nitrogen, argon, hydrogen, ammonia or borazine ($B_3N_3H_6$) may be added to the two precursors as required. The total pressure in the quartz tube enclosing component 10 is typically in the range of 0.001–100 Torr, and as an example may be 0.5 Torr. The pressure is controllable independent of the gas flow rates.

During CVD (steps 95 and 100), the coating is deposited on the component and into the pores of the component by infiltration. The methylsilane and nitrous oxide gases deposit a coating having a general composition of $SiO_XC_Y$ onto and into the C—C components. Alternative coatings of the type $SiC_XN_Y$, $SiO_XC_YN_Z$ and $SiC_XN_YB_Z$ and their alloys may be obtained by appropriate choice of precursors and processing conditions.

The CVD method lends itself to scale up to components, which may be several feet in dimension, as well to coating complex parts such as C—C heat exchanger cores and manifolds. Detailed design of the CVD reactor may be modified to accommodate components of different sizes and shapes. The refractory coatings created by the chemical vapor deposition process are generally thinner than the fluidized glass coatings. For example, the refractory coatings may be less than 10 micrometers thick. In addition, the chemical vapor deposition process allows for efficient conformal coating and infiltration onto/into complex shaped parts, excellent control of coating thickness and generally lower application/annealing temperatures.

While the chemical vapor deposition takes place in an oxidizing ambient, the component temperature and other process conditions are properly adjusted such that, at most, only negligible oxidation of the carbons in the substrates occurs during the coating process.

The fluidized glass coating tends to self-heal, in that it can soften, flow and/or penetrate or fill via the vapor phase micro cracks previously formed at lower temperatures in the glass itself or in an underlying or overlying refractory i.e., rigid coating applied to the C—C component, or in the C—C article. The fluidized glass coating 12 tends to penetrate into residual pores or cavities present in the component 10 and into micro-cracks, which may also be present in the component as a result of thermal cycling during initial fabrication or later use.

Instead of dip coating or immersing the C—C component in a bath of liquid glass precursor, the fluidized glass precursor may be brush-coated directly onto the component. Alternatively, the fluidized glass coating may be applied by gravity feed, forced convection, sol-gel, spray coating, atomizing at atmospheric or lower pressure, or applied by CVD or any other known method. The immersion may be carried out at room temperature or at an elevated temperature. The glass coating provides protection against oxidation even if the thickness of the coating is not uniform over the entire surface of the substrate, due to the fluidizing and self-healing application process. Once a coating of refractory ceramic or glass-ceramic material is preferably applied to a C—C component by CVD or PECVD, it is within the scope of the present invention to augment the degree of oxidation protection afforded the component by application of a further coating of fluidized glass material in accordance with the process set forth herein.

The present invention has been described with reference to specific embodiments thereof. However, variations to the embodiments may be made which, nonetheless, lie within the spirit and scope of the appended claims.

What is claimed is:

1. A method of protecting a carbon fiber or carbon-carbon (C—C) composite component of approximately 3–30 mils thickness against oxidation, the method comprising the steps of:

applying a coating of fluidized glass precursor over, without impregnating, the component by immersing the C—C component in a bath containing glass precursors;

gradually heating the precursor-coated component to a temperature range at which glass transition temperature of the glass will be thermally matched to the oxidation temperature of the carbon in the C—C component; and gradually cooling the glass-coated component to envelope the C—C component in a solid glass coating, without the solid glass coating impregnating the C—C component.

2. The method according to claim 1, further including the step of rotating either the C—C component or the bath relative to one another when the component Is Immersed in the fluidized glass precursor to completely and uniformly cover the component with the fluidized glass precursor.

3. The method according to claim 1, further including the step of immersing the component in the precursor bath for more than one minute.

4. The method according to claim 1, further including the step of gradually heating the glass precursor coated component at a rate of about 1–2° C. per minute to a temperature of between about 250–350° C. and maintaining the temperature at 250–350° C. for a period of between 1–10 hours.

5. The method according to claim 4, further including the step of continuing to heat the coated component at a temperature of between 550–650° C. for a period of between 1–10 hours.

6. The method according to claim 1, further including the step before applying the fluidized glass precursor of heating the component in a furnace at a temperature in the range of 20–900° C., directing at least one gaseous precursor around the component while heating both the precursor and the component to achieve chemical vapor deposition of the gaseous precursor as a coating adhering to the component, and infiltrating the component.

7. The method according to claim 6, further including the step of directing gaseous methylsilane ($SiCH_3H_3$) and nitrous oxide ($N_2O$) around the C—C component as it is heated in the furnace.

8. The method according to claim 7, further including the step of depositing a coating on the component having a general composition of $SiO_XC_Y$ wherein the ratio of x:y may be altered to control the characteristics of the protective coating.

9. The method according to claim 8, further including the step of creating a refractory coating less than 10 micrometers in thickness.

10. The method according to claim 6, further including the step of heating the component in the furnace at a temperature of about 700° C. at a pressure in the range of 0.001–100 Torr.

11. The method of claim 1, wherein the component is a heat exchanger component.

12. The method of claim 1, wherein the glass precursor includes a borophosphate glass precursor.

13. The method of claim 1, wherein the coating also includes boron carbide.

14. The method of claim 1, wherein the coating also includes boron in an amount sufficient to scavenge oxygen.

15. A method of coating an outer surface of a carbon fiber or carbon-carbon (C—C) composite component of approximately 3–30 mils thickness against oxidation, the method comprising the steps of:

preparing a liquid precursor including phosphoric acid manganese phosphate, potassium hydroxide, boron nitride, boron and water;

maintaining the precursor at a temperature in the range of 20–90° C.;

applying a coating of the liquid precursor to an outer surface of the component, without impregnating the component;

annealing the coated component at a temperature in the range of 250–650° C.; and creating a solid glass protective coating of approximately 1–10 mils thickness enveloping without impregnating the component for protecting the component from oxidizing species.

16. The method according to claim 15, further including the step of gradually heating the precursor-coated component at a rate of 1–2° C. per minute until reaching a temperature in the range of 250–350° C. and maintaining this temperature for between 1–10 hours to further anneal the coated component.

17. The method according to claim 16, further including the step of gradually heating the precursor-coated component from a temperature in the range of 250–350° C. to a temperature in the range of 550–650° C. and maintaining this temperature for between 1–10 hours to further anneal the coated component.

18. The method according to claim 15, further including the step of applying a liquid precursor of fluidized glass over a C—C component having a thickness of approximately 3–30 mils.

* * * * *